(12) United States Patent
Hoover

(10) Patent No.: US 8,948,376 B2
(45) Date of Patent: Feb. 3, 2015

(54) FORMAT-PRESERVING ENCRYPTION VIA ROTATING BLOCK ENCRYPTION

(75) Inventor: Douglas Neil Hoover, Sunnyvale, CA (US)

(73) Assignee: CA, Inc., New York, NY (US)

( * ) Notice: Subject to any disclaimer, the term of this patent is extended or adjusted under 35 U.S.C. 154(b) by 546 days.

(21) Appl. No.: 13/007,075

(22) Filed: Jan. 14, 2011

(65) Prior Publication Data

US 2011/0280394 A1   Nov. 17, 2011

Related U.S. Application Data

(60) Provisional application No. 61/333,639, filed on May 11, 2010.

(51) Int. Cl.
| | | |
|---|---|---|
| *H04K 1/00* | (2006.01) | |
| *H04L 9/00* | (2006.01) | |
| *H04L 9/28* | (2006.01) | |
| *H04L 9/06* | (2006.01) | |

(52) U.S. Cl.
CPC ............ *H04L 9/0618* (2013.01); *H04L 9/0687* (2013.01); *H04L 9/0625* (2013.01)
USPC ............................................ 380/28; 380/259

(58) Field of Classification Search
CPC combination set(s) only.
See application file for complete search history.

(56) References Cited

U.S. PATENT DOCUMENTS

| | | | | |
|---|---|---|---|---|
| 5,124,541 A | * | 6/1992 | Oksala | 235/494 |
| 5,838,794 A | * | 11/1998 | Mittenthal | 380/28 |
| 5,838,795 A | * | 11/1998 | Mittenthal | 380/28 |
| 5,838,796 A | * | 11/1998 | Mittenthal | 380/28 |
| 5,949,884 A | * | 9/1999 | Adams et al. | 380/29 |
| 6,035,042 A | * | 3/2000 | Mittenthal | 380/37 |
| 6,189,095 B1 | * | 2/2001 | Coppersmith et al. | 713/150 |
| 7,450,717 B1 | | 11/2008 | Sprunk et al. | |
| 2002/0118827 A1 | * | 8/2002 | Luyster | 380/37 |
| 2004/0086117 A1 | * | 5/2004 | Petersen et al. | 380/44 |
| 2004/0091107 A1 | * | 5/2004 | Fujisaki et al. | 380/42 |
| 2008/0170693 A1 | | 7/2008 | Spies et al. | |
| 2008/0232597 A1 | * | 9/2008 | Mare | 380/278 |
| 2008/0253561 A1 | * | 10/2008 | Minematsu | 380/29 |
| 2009/0055458 A1 | * | 2/2009 | O'Neil | 708/400 |
| 2009/0103716 A1 | * | 4/2009 | Shirai | 380/28 |

(Continued)

FOREIGN PATENT DOCUMENTS

WO   2011/143257 A1   11/2011

OTHER PUBLICATIONS

Bellare, M. et al., "Format-preserving encryption", Selected Areas in Cryptography, Springer Berlin/Heidelberg, 2009, 25 pages.

(Continued)

*Primary Examiner* — Azizul Choudhury
(74) *Attorney, Agent, or Firm* — Vierra Magen Marcus LLP

(57) ABSTRACT

Methods and systems are described for format-preserving encryption. Format-preserving encryption on an entire format F may be achieved by performing format-preserving encryption on one or more subsets of F and then applying one or more permutation rounds in such a way that all elements of F enter a subset to be encrypted. A predetermined number of encryption rounds and a predetermined number of permutation rounds may be interleaved until all elements are thoroughly mixed. The resultant output data may be saved in a database in the same format as the original input data, meet all constraints of the database, and pass all validity checks applied by software supporting the database.

26 Claims, 7 Drawing Sheets

(56) References Cited

U.S. PATENT DOCUMENTS

2009/0146851 A1* 6/2009 Lablans .......................... 341/89
2010/0014659 A1* 1/2010 Shibutani et al. ............... 380/28
2010/0074441 A1   3/2010 Pauker et al.
2010/0111297 A1   5/2010 Pauker et al.

OTHER PUBLICATIONS

Black, J. et al., "Ciphers with Arbitrary Finite Domains", Topics in Cryptology—CT-RSA 2002, LNCS vol. 2271, pp. 114-130, 2002.
Luby, M. et al., "How to Construct Pseudorandom Permutations from Pseudorandom Functions", SIAM Journal of Computing, vol. 17, No. 2, Apr. 1988, pp. 373-386.
Patarin J., "Security of Random Feistel Schemes with 5 or more Rounds", Advances in Cryptology—CRYPTO 2004, Springer Berlin/Heidelberg, 2004, 17 pages.
Spies, T., "Feistel Finite Set Encryption Mode", NIST Proposed Encryption Mode, Available online at http://csrc.nist.gov/groups/ST/toolkit/BCM/documents/proposedmodes/ffsem/ffsem-spec. pdf (2008), 10 pages.
International Search Report and Written Opinion of International Application No. PCT/US2011/035976, mailed Sep. 16, 2011, 7 pages.
International Preliminary Report on Patentability of International Application No. PCT/US2011/035976, mailed Apr. 2, 2012, 8 pages.
Response to European Office Action dated May 30, 2013, European Patent Application No. 11781172.9 filed May 10, 2011, 8 pages.

* cited by examiner

FORMAT-PRESERVING ENCRYPTION VIA ROTATING BLOCK ENCRYPTION

CROSS-REFERENCE TO RELATED APPLICATIONS

This application claims the benefit under 35 U.S.C. §119 (e) of U.S. Prov. Pat. App. No. 61/333,639, filed May 11, 2010, the disclosure of which is hereby incorporated by reference herein in its entirety.

BACKGROUND OF THE INVENTION

The world is now full of databases. Some of these databases contain sensitive information on systems that are accessible from a network, such as the Internet. For example, credit card numbers, social security numbers, loan information, and medical information may all be available to authorized users in various databases. Sometimes, however, this sensitive information may become accessible to unauthorized users. For example, there have been many news stories about computer break-ins that compromise this sensitive information. One way to protect sensitive data is to encrypt the data before storing it in a database. This data, however, is often stored in databases that are served by software code that may make assumptions about the length, format, or both, of the various data items.

For example, credit card numbers and social security numbers may contain strings of decimal digits in a certain format, some dollar amounts may be limited to a certain range, some strings may only include alphabetic characters, and dates and zip codes may conform to a prescribed format or formats. It is generally not feasible to rewrite all this database code to support alternate formats, so it would be useful to encrypt data in a way that preserves its format well enough that the database code will still function properly and any validity checks that the code performs will still pass.

In cryptography, format-preserving encryption (FPE) refers to encrypting in such a way that the output (the ciphertext) is in the same format as the input (the plaintext). Several techniques for performing FPE are known. For example, one common approach is to use a Feistel or Luby-Rackoff scheme. The Feistel scheme is a method for adapting a block cipher, like AES, to produce a block cipher whose domain is closer in size to the number of elements in a given format. (The domain of, for example, AES is a power of $2^{128}$, which is not likely to be near the size of most formats to be encrypted.)

Feistel or Luby-Rackoff provides a way to obtain a cipher whose domain is close to a given size. Cycle walking is a technique for bridging the gap between the domain of a Feistel cipher and a format to encrypt. For example, a block cipher, such as AES, or more likely a block cipher derived from AES using a Feistel scheme, whose domain contains a format to encrypt, may be repeatedly applied to a plaintext from that format until the resultant ciphertext again lies in that format. Cycle walking has an advantage in that the elements of the desired format need not be mapped to a consecutive sequence of integers. Cycle walking, however, also has a disadvantage in that the number of iterations of the block cipher required for each FPE operation is unpredictable. For example, using cycle walking, the average the number of iterations of the block cipher is given by the size of domain of the block cipher divided by the number of elements in the format, but the actual number of iterations is random and may be quite large and is unpredictable.

SUMMARY OF THE INVENTION

In view of the foregoing, a format-preserving encryption (FPE) scheme is provided. The resultant ciphertext of the FPE scheme, which may conform to the same format as the input plaintext, may then be stored (e.g., saved in a database with consistency constraints) securely and efficiently. Given a format F, one or more subsets (or subformats) $S_1, S_2, \ldots, S_N$ may be defined. Each of these subsets may be associated with an FPE function, $f_1, f_2, \ldots, f_N$ and a key $k_1, k_2, \ldots, k_N$ associated with the FPE function.

In some embodiments, FPE may be performed on the entirety of F by choosing one or more disjoint subsets $S_i$, encrypting the one or more disjoint subsets using an FPE function $f_i$ and some key $k_i$, permuting the elements of F in some way that may or may not require a key (e.g., so that some elements not included in any of the chosen disjoint subsets for encryption are moved into one of the disjoint subsets and other elements that were in any of the chosen disjoint subsets for encryption are moved out), and repeating the encrypting and permuting steps until all the elements of F have been moved through subsets that have been encrypted, so that the elements of F are well-mixed together. At each encryption step, the block cipher applied may be weak, such as one or more iterations of a Feistel scheme (e.g., a bitwise or arithmetic Feistel scheme), as long as the cumulative encryption over many encryption steps and/or permutation steps is strong.

In some embodiments, permutation may not be used but the disjoint subsets $S_i$ chosen for encryption may be changed at each encryption iteration in such a way that the chosen subsets overlap with those used in one or more of the previous iterations. In this way, elements that were encrypted in the previous iteration are encrypted in the same subset with other elements that were not encrypted in the previous iteration (or that were in a different subset).

Whether permutations are used or the encryptions subsets are changed from encryption step to encryption step, in some embodiments the encryption subsets group elements in many different ways, so that at the conclusion of the FPE operation all the elements in the initial FPE set are well-mixed by the encryption, i.e., the encryption appears to permute the elements in the initial FPE set randomly. After an initial encryption round, permutation round, or both, a predetermined number of additional encryption rounds and a predetermined number of additional permutation rounds may be performed. Some of the additional encryption rounds may be interleaved with some of the additional permutation rounds.

To decrypt the result, each step may be replaced by its inverse (e.g., encryption with a key replaced with decryption using the same key, a permutation by the inverse permutation, etc.) and applying the steps in the reverse order.

In some embodiments, a set of objects is received in a given format, wherein the given format is associated with one or more conditions that the received set of objects satisfy. For example, the format may be associated with one or more length constraints and/or one or more value constraints. One or more first disjoint subsets of the set of objects are selected. The selected disjoint subsets are then encrypted, using a first encryption scheme, to create a partially-encrypted set of objects. The partially-encrypted set of objects is permuted. For example, the set of objects may be shifted, rotated, or otherwise mixed with or without the use of a key. One or more second disjoint subsets of the permuted partially-encrypted set of objects are selected. The selected one or more second disjoint subsets encrypted, using a second encryption scheme, to create an encrypted set of objects. The encrypted set of objects are in the same format as the format in which the set of objects were received.

BRIEF DESCRIPTION OF THE DRAWINGS

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
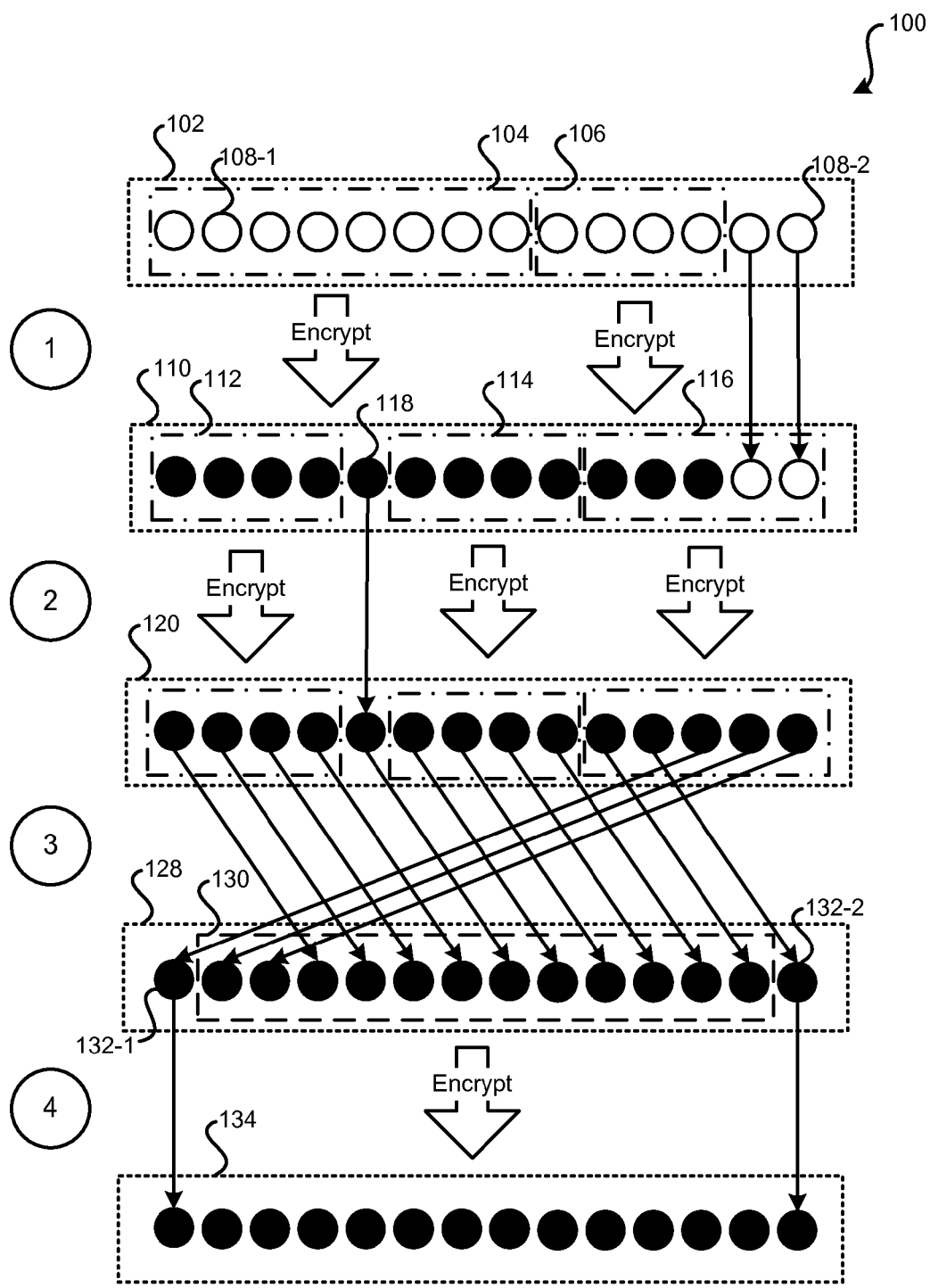
FIG. 1 illustrates a simplified approach for encrypting a format in accordance with one embodiment of the invention.

A format-preserving encryption (FPE) scheme that encrypts a given format into a resultant ciphertext of the same format is provided. A format is defined as any particular finite set of objects representable in a machine (e.g., in a computer). The objects may include numbers, bitstrings, strings of characters or other symbols, or any kind of object representable in a computer or other machine. Typically, a format can be defined as set of strings of symbols of some kind that satisfy one or more length constraints and some other value constraint or set of value constraints.

An example format is the set of allowable values for some database field. Allowable values may include values both meeting the specification for the field in the database and passing any other validity checks required by the database application context. For example, a database field storing a social security number (with dashes, like 123-45-6789) may accept any eleven character string, but a valid social security number in this format must include three decimal digits, followed by a dash, followed by two decimal digits, followed by a dash, followed by four decimal digits. This set of length and value constraints may define the format. In addition, the following additional value constraints may be imposed on the format:

The digits in any group (separated by a dash) may not be all 0's;

The first three digits may not be 666 (the "number of the beast");

The number may not be 987-65-432d for some decimal digit d (these numbers are reserved for advertising); and The number may not be 078-05-1120 (a number that was used in an advertising campaign and subsequently was given by many people as their social security number).

Given a format F, an encryption function fpe may be defined that, given a small piece of secret information k, called a key, and an element a in F, can transform a into another element b in F in accordance with $$b = fpe(k, a) \quad \text{(EQ. 1)}$$

so that it is easy to recover a from b and k, but very hard to recover b from a without the key k.

The fundamental motivation for a FPE scheme is that common ciphers, such as DES or AES, can only encrypt sets of rather large and widely spaced sizes, such as $2^{k*64}$ or $2^{k*128}$, depending on the cipher and the mode in which the cipher is used. Using schemes, such as a bitwise or arithmetic Feistel (also called Luby-Rackoff) scheme, which is described in more detail below, any block cipher may be reduced to a block cipher that can encrypt a set of size M where either $$M = 2^n \quad \text{(EQ. 2)}$$

for some positive integer n, for a bitwise Feistel scheme, or else $$M = a*b \quad \text{(EQ. 3)}$$

for two numbers a and b of about the same size, for an arithmetic Feistel scheme. These two encryption set sizes are usually much closer to the size of an arbitrary finite set that is desired to be encrypted, but not every format will be of one of these sizes. A way to bridge this remaining gap of encryption set sizes is described in more detail below.

In some embodiments, an iterative approach is used in an FPE scheme. The FPE scheme may include any number of iterations; however, in actual implements, several iterations are used so that the resultant ciphertext is cryptographically secure. At each iteration, one of the following steps may be performed:

(a) Choose one or more disjoint subsets S1, . . . , Sn of the format. The disjoint subsets are chosen so that each subset is of a size that can be encrypted using an existing cipher (such as a bitwise or arithmetic Feistel cipher). For each chosen subset, select a cipher and a key. The cipher and key pair may be the same or different for each chosen subset. Encrypt each chosen subset.

(b) Permute the elements of the format.

The subsets chosen in iterations of step (a) may be the same or different from one iteration to the next, as may be the ciphers and keys used. In some embodiments, the sets and permutations may be chosen so that every element is encrypted. If the cipher is one that needs to be applied several times to be cryptographically secure (for example, as in a Feistel cipher), then on average each element may be encrypted at least that corresponding number of times to be cryptographically secure. The subsets to be encrypted may also be varied or the elements permuted in such a way that elements get well-mixed together, so that it is hard to deduce information about information about the plaintext (or the unencrypted elements), even statistically (such as whether the plaintext lay in the top or bottom half of the format), from information about the ciphertext (or the encrypted elements).

FIG. 1 is a simplified illustration of the above approach. The format in set 102 contains fourteen elements 108 (although any number of elements may be supported in actual implementations). In the first iteration, subsets 104 and 106 are chosen. Subset 104 contains the first eight elements, and subset 106 contains the next four elements. Subsets 104 and 106 are then encrypted. The encryption may be performed using one or more iterations of a bitwise Feistel scheme, because the subset sizes have been chosen to be appropriate for a bitwise Feistel scheme (for example, see EQ. 2, above). The last two elements in set 102 (for example, including element 108-2) are not encrypted.

In the second iteration, we choose subsets 112, 114, and 116. Subset 112 contains the first through the fourth elements, subset 114 contains the sixth through the ninth elements, and subset 116 contains the tenth through the fourteenth elements. Each of subsets 112, 114, and 116 is then encrypted. For example, subsets 112 and 114, which each contain four elements, may be encrypted using a bitwise Feistel scheme. Subset 116, which is not a suitable size for either a bitwise or arithmetic Feistel scheme, may be encrypted using any other encryption cipher or scheme that can operate on a set size of five elements. Element 118 (corresponding to the fifth element in set 110) is not encrypted during this iteration.

In the third iteration, the elements of set 120 may be permuted. The permutation may take any suitable form, such as a shift or rotation of the elements in set 120. As shown in the example of FIG. 1, the elements in set 120 are rotated three positions to the right resulting in permuted set 128.

In the fourth iteration, subset 130 is chosen to contain the middle twelve elements of permuted set 128. Subset 130 is then encrypted while elements 132-1 and 132-2 are not encrypted. The encryption used in this iteration may include one or more iterations of an arithmetic Feistel scheme with M=12=4*3 (for example, see EQ. 3, above).

Although FIG. 1 illustrates one approach using four encryption/permutation iterations, in actual implementations, several additional iterations (e.g., 8, 12, or 32 total iterations) of encryption and/or permutation steps may be used. In addition, any suitable number of disjoint subsets, each of any suitable size (e.g., a size suitable for a bitwise Feistel scheme, an arithmetic Feistel scheme, or any other suitable encryption scheme) may be used in other embodiments. The selected subsets to be encrypted may be the same or different from encryption iteration to encryption iteration.

To decrypt set 134, the steps of the iterations described above may be performed in reverse order, applying the inverse of each step at each iteration. That is, for each encryption step, the same subsets may be chosen, the same ciphers, and the same keys, but decrypt the elements of each set instead of encrypting. For each permutation step, the inverse permutation may be applied.

It has been assumed that sets of arbitrary elements may be encrypted, at least if the set is of an appropriate size. In fact, however, practical ciphers operate either on bitstrings of a given length (for example, AES, DES, and bitwise Feistel) or else on an initial segment of non-negative integers (for example, arithmetic Feistel). Since bitstrings of a given length correspond to non-negative integers less than $2^{length}$, practical ciphers may be regarded as operating on initial segments of non-negative integers.

Thus, if a set has N elements, $S=\{s\_0, \ldots, s\_(N-1)\}$, and given a cipher enc(k,.) that, given a key k, maps the integers $0, \ldots, N-1$ to themselves, then the elements of S may be encrypted by mapping $$s\_i \to i \to enc(k,i) \to s\_enc(k,i)$$

The process of numbering the elements of S and mapping $s\_i \to i$ is called encoding (encoding the elements of S as integers). The inverse mapping $i \to s\_i$ is called decoding. Thus, an element of a set S of a suitable size may be encrypted by encoding an element into an integer, encrypting the integer, and then decoding the result back into an element. An element may be decrypted by encoding the element into an integer, decrypting the integer, and then decoding the result back into another element.

In principle, an encoding and decoding can be given for any finite set. Whether an efficient encoding can be defined depends on how the set is defined. One example encoding and decoding is described below in the context of social security numbers.

Thus, for example, in the first step in FIG. 1, each chosen set (i.e., sets 104 and 106) may be encrypted by encoding each set's elements, applying one or more iterations of either a bitwise or an arithmetic Feistel scheme (or any other suitable encryption scheme or cipher), and then decoding. It is more efficient, however, if the whole set S is first encoded, then the iterative procedure is applied, and then, only when the iterative procedure is complete, decode back into an element of S. The one or more encryption iterations may use any suitable cipher; bitwise and arithmetic Feistel schemes are examples only.

Furthermore, in practice, it may be sufficient to use the same subsets for every encryption iteration and use periodic permutations between the encryption iterations to ensure that all elements get encrypted and that the elements are adequately mixed together.

Figure 2A:
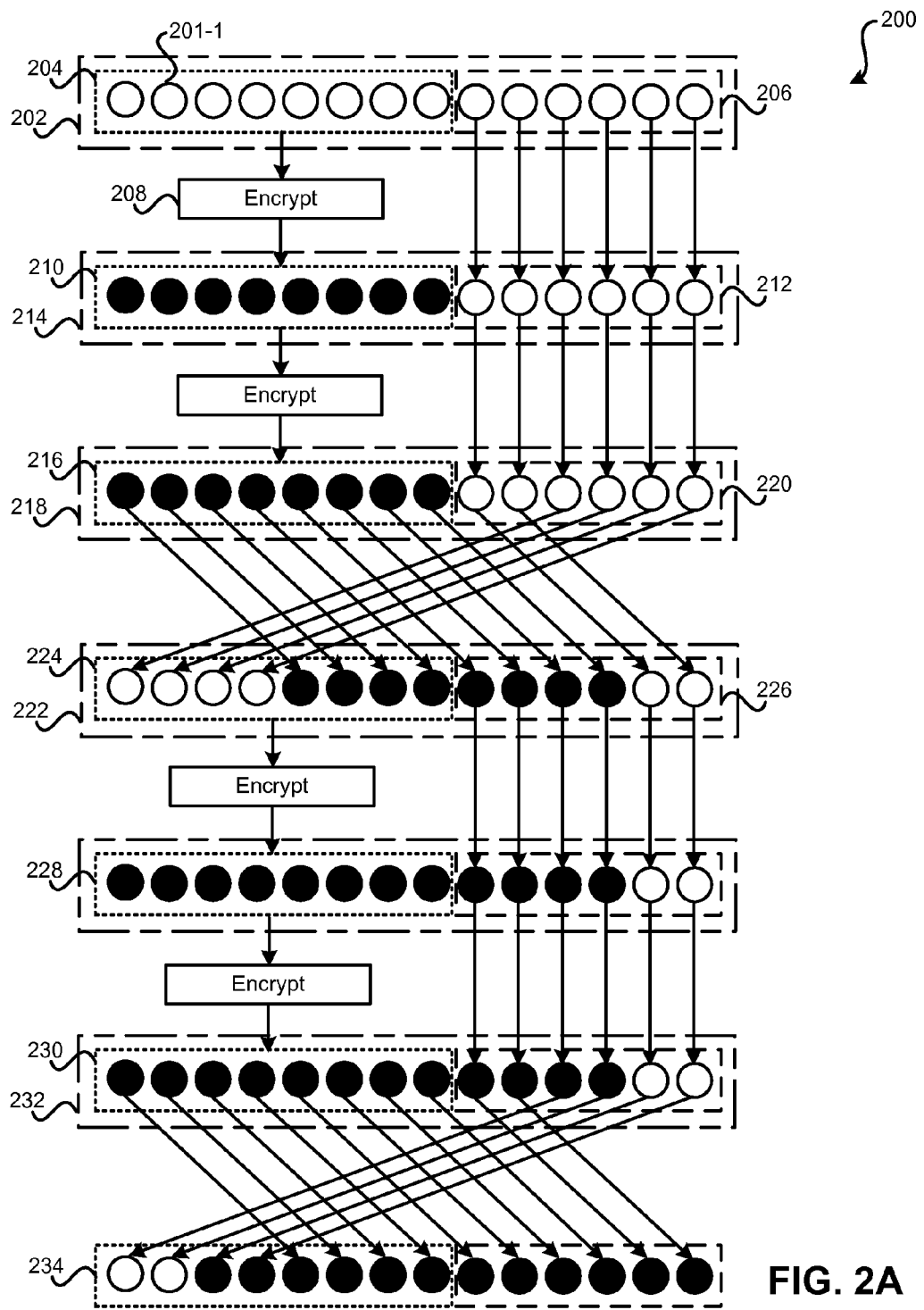
FIG. 2A illustrates another simplified embodiment of an FPE arrangement using a bitwise Feistel scheme for encryption in accordance with one embodiment of the invention.
Figure 2B:
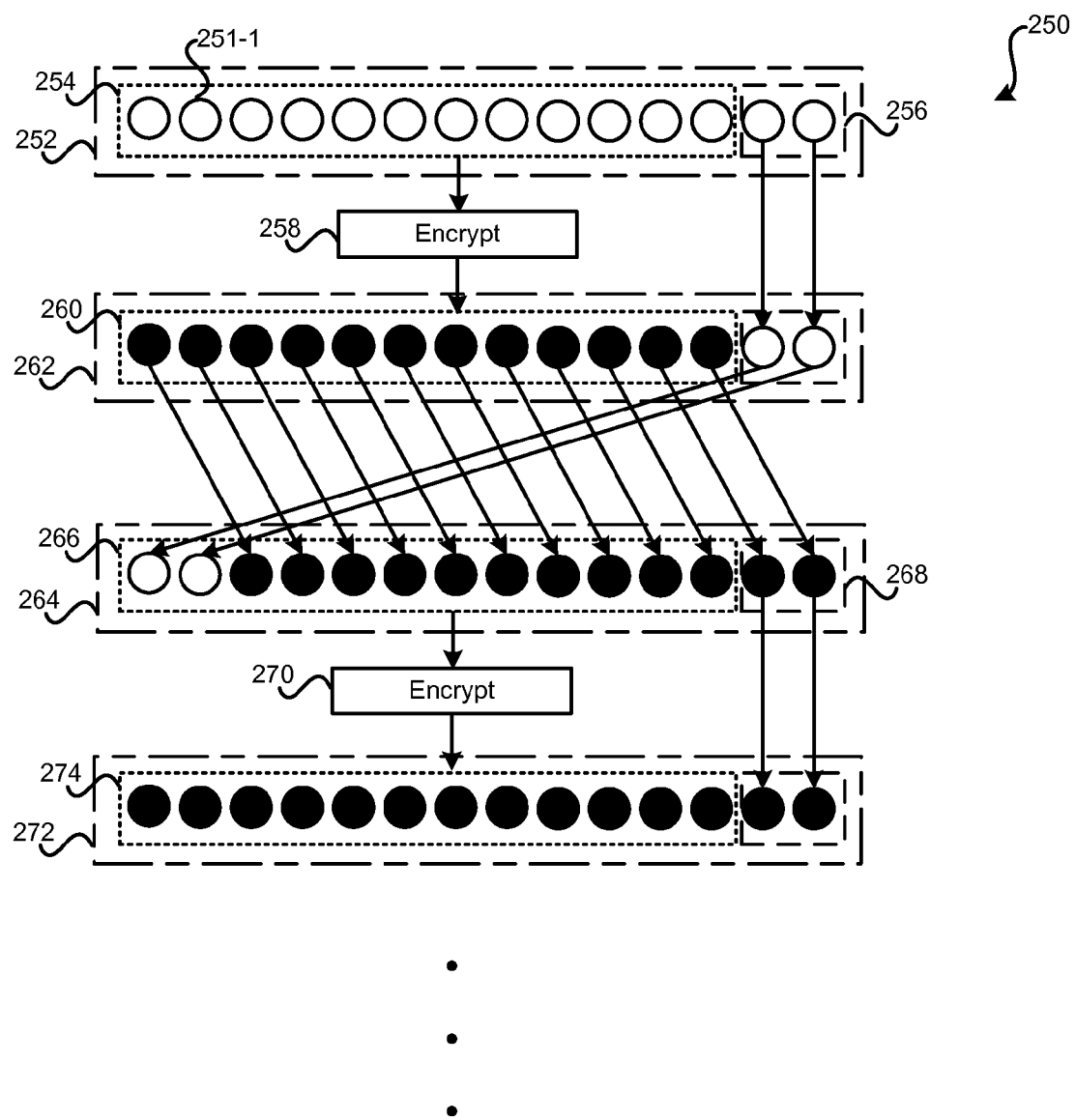
FIG. 2B illustrates another simplified embodiment of an FPE arrangement using an arithmetic Feistel scheme for encryption in accordance with another embodiment of the invention.

FIGS. 2A and 2B illustrate two embodiments of the invention, respectively using bitwise and arithmetic Feistel schemes for the encryption steps. As shown in the example of FIG. 1, bitwise Feistel schemes may be used in conjunction with arithmetic Feistel schemes, during the same encryption iteration or different encryption iterations. Other suitable encryption schemes and ciphers may also be used in conjunction with the bitwise and/or arithmetic Feistel schemes, during the same encryption iteration or different encryption iterations.

In some embodiments, FPE is performed in accordance with the present invention in the following way. First, the subset size M is chosen as large as possible so that M≤N and M is suitable for one of the two types of Feistel schemes (e.g., bitwise or arithmetic). Second, given a number m, such that 0≤m<N:
 (a) If m<M, a Feistel cipher (using some key k) is applied to m, obtaining m'. If m≥M, let m'=m.
 (b) Let $m_1 = m' + M/2 \mod N$.
Third, the above steps are repeated several times until all numbers are guaranteed to have had the Feistel cipher applied to numbers enough times to get the numbers well-mixed. In some embodiments, 5 or 8 iterations are performed. In other embodiments more or fewer iterations are performed.

In some embodiments, a natural number M close to N is selected for which there exists some kind of Feistel round, round, based on a well-known cipher (such as AES or DES) where round maps $K \times \{0, \ldots, M-1\} \to \{0, \ldots, M-1\}$ where K is the keyspace of the underlying cipher, such as AES or DES. Then, several of these rounds are applied with different keys to an input set to be encrypted, together with some sort of adjustments that change the encryption done by the round function, which encrypts $\{0, \ldots, M-1\}$, so that it encrypts $\{0, \ldots, N-1\}$, as desired. The adjustments may include permutations, encrypting different subsets, or both.

As mentioned above, at least two types of round functions may be used. One round function is associated with a bitwise scheme and the other is associated with an arithmetic scheme. Additionally or alternatively, any other suitable type of round function using any other suitable encryption scheme or cipher may be used in other embodiments.

FIGS. 2A and 2B illustrate simplified embodiments of an FPE scheme. There are two well-known Feistel schemes for encrypting segments of natural numbers having a particular length. The first scheme is a Luby-Rackoff bitwise Feistel scheme and is illustrated in FIG. 2A. Any initial segment of non-negative integers $0, \ldots, 2^n-1$ may be encrypted using this scheme by regarding each integer as a bitstring of length n. A well-known block cipher, such as AES or DES, may be used as the underlying cipher.

The second scheme is the Black-Rogaway arithmetic Feistel scheme and is illustrated in FIG. 2B. In this scheme, an initial segment of integers $0, \ldots, (a*b)-1$ may be encrypted based on an underlying well-known block cipher such as AES or DES. For this scheme to encrypt efficiently, a and b should be approximately the same size.

FIG. 2A shows FPE arrangement 200 using a Luby-Rackoff bitwise Feistel scheme. To allow for encryption, the set of objects (a total of N objects) may first be encoded to be represented by a set of non-negative integers $0, \ldots, N-1$. A bitstring of length n may be used to represent any number m of the set of integers, such that $m<2^n$. Here, the bitstring may be four bits, because fourteen, the number of objects in set of objects 202, is less than $2^n$, wherein n is four. So that the objects may later be decoded, a key or table that identifies what object is represented by what integer may be stored.

Since set of objects 202 contains fourteen objects (such as object 201-1) and fourteen is not a power of 2, it is not possible to encrypt set of objects 202 all at once using a bitwise Feistel scheme. The greatest power of 2 that is less than the number of objects in set of objects 202 may be used to determine the size of subset 204 according to EQ. 2, above, such that M (the number of objects in subset 204) is less than N (the number of objects in the set of objects 202). Therefore, in the example of FIG. 2, eight objects (represented by subset 204 in FIG. 2) of the fourteen objects may be encrypted during the first round of encryption. The remaining six objects (represented by subset 206) are not encrypted during the first round of encryption at block 208.

In the embodiment of FIG. 2A, since the subset to be encrypted is eight (M) objects (which, to be clear, are encoded and represented by integers), n (the number of bits representing each object of subset 204) is three. Given n=a+b, then, in the embodiment of FIG. 2A, a is one, and b is two, with each encoded object of subset 204 being represented by three bits where b is either equal to a (if n is even) or a+1 (if n is odd).

L may then represent the first a bits of each object's bitstring of subset 204 and R may represent the last b bits of each object's bitstring of subset 204, according to EQ. 4 and EQ. 5

$$L=m \bmod 2^a (a \text{ bits}) \qquad (\text{EQ. 4})$$

$$R=m \text{ div } 2^a (b \text{ bits}) \qquad (\text{EQ. 5})$$

Thus, m may be given in accordance with:

$$m=L+2^a*R \qquad (\text{EQ. 6})$$

If e(key, iv, plaintext) represents a block cipher, such as AES or DES, it may be used in a cipherblock chaining mode with an initialization vector iv. Plaintext may be any length. That is, plaintext may be padded, if required, to a multiple of the block length of the cipher e. b bits of result may be needed, so padding may be performed to a number of blocks whose total length is at least b bits.

In the context of FPE, it may not be possible to use an initialization vector (instead, a fixed value, such as a bitstring of all 0's, may be used), but sometimes the encryption of different fields in a database row may be chained together, or an arbitrary row index (such as an auto-incrementing primary key), field name, or both can be used to make an initialization vector for encrypting each field in the row.

Given a key k and an iv for e, let:

$$L'=e(k,iv,\text{pad}(L))\oplus R(b \text{ bits}) \qquad (\text{EQ. 7})$$

$$R'=L(a \text{ bits}) \qquad (\text{EQ. 8})$$

Here, the symbol "$\oplus$" refers to the bitwise exclusive OR function, which is familiar in computing. Here and elsewhere we will understand it as returning as many bits as the shorter argument, R, contains.

The result of the round is given in accordance with:

$$\text{bitwise\_round}(k,iv,m)=m'=L'+2b*R'(a+b=n \text{ bits}) \qquad (\text{EQ. 9})$$

Therefore, m' represents the encrypted version of m. Note that the inverse of a round may be obtained by processing the equations defining a round from the bottom to the top (e.g., in reverse order). That is, to decrypt m', (which is a member of $\{0, \ldots, M-1\}$), let $$L'=m' \bmod 2b(b \text{ bits}) \qquad (\text{EQ. 10})$$

$$R'=m' \text{ div } 2b(a \text{ bits}) \qquad (\text{EQ. 11})$$

so that:

$$m'=L'+2b*R' \qquad (\text{EQ. 12})$$

Further, let:

$$L=R'(a \text{ bits}) \qquad (\text{EQ. 13})$$

$$R=e(k,iv,\text{pad}(L))\oplus L'(b \text{ bits}) \qquad (\text{EQ. 14})$$

Then, accordingly:

$$m=\text{inverse\_bitwise\_round}(k,iv,m')=L+2a*R \qquad (\text{EQ. 15})$$

wherein m represents the original m (i.e., m' decrypted).

As mentioned above, subset 204 is encrypted at block 208 while subset 206 is not encrypted. After this first iteration, partially-encrypted set 214 is created. Within set 214, subset 210 corresponds to the encrypted subset 204 and subset 212 corresponds to the unencrypted subset 206. During a second iteration, a second round of encryption (e.g., using a bitwise Feistel scheme) may be performed on subset 210, resulting in subset 216 of set 218. Subset 220 may be unencrypted. During a third iteration, a permutation of the objects in set 218 may be performed. For example, the objects in set 218 may be shifted or rotated, resulting is set 222. As shown in the example of FIG. 2A, because of the permutation performed during the third iteration, some of the objects in the subset to be encrypted have moved out of subset 224 while other objects have moved into subset 224. Two additional rounds of encryption (e.g., using a bitwise Feistel scheme) may be performed on subset 224, resulting in subsets 228 and 230, respectively, while subset 226 is not encrypted. Finally, the objects in set 232 may be permuted once again, resulting in set 234.

Although the example of FIG. 2A shows six combined iterations of permutation and encryption, in actual implementations, any suitable number of iterations may be used. In addition, although two rounds of encryption are shown between each permutation round, any number if encryptions rounds may be performed between permutation rounds.

Instead of encrypting using Feistel bitwise rounds, arithmetic Feistel rounds may also be used to encrypt a format consisting of 14 elements, as shown in FIG. 2B. From EQ. 3 above, since N=14, a=3, b=4 and M=a*b=12. Given that m<ab, let:

$$L = m \bmod a (L < a) \quad (EQ. 16)$$

$$R = m \operatorname{div} a (R < b) \quad (EQ. 17)$$

$$L' = (e(k, iv, L) + R) \bmod b (L' < b) \quad (EQ. 18)$$

$$R' = L (R' < a) \quad (EQ. 19)$$

$$m' = L' + b*R' \quad (EQ. 20)$$

$$L'' = (e(k', iv', L') + R') \bmod a (L'' < a) \quad (EQ. 21)$$

$$R'' = L' (R'' < b) \quad (EQ. 22)$$

The result of the round is given in accordance with:

$$\text{arithmetic\_round}(k, k', iv, iv', m) = m'' = L'' + a*R'' \quad (EQ. 23)$$

In this embodiment, a round of encryption using an arithmetic Feistel scheme may correspond to two rounds of the bitwise scheme (i.e., a double round). This may allow for avoiding the arithmetic involved in putting L' and R' together to make m' and then taking L' and R' apart again for the second round.

As shown in FIG. 2B, set 252 contains 14 elements (such as element 251-1). The first 12 of these elements are grouped in subset 254 while the last two elements are grouped in subset 256. At block 258 subset 254 is encrypted using an arithmetic Feistel scheme. The encryption results in subset 260 of set 262. A permutation round is then performed, resulting in set 264. Subset 266 may be encrypted again, resulting in subset 274 while subset 268 in not encrypted One or more subsequent iterations of encryption and/or permutation may be performed on set 272 to complete the FPE.

As with the Feistel bitwise round, different keys may be used in different rounds of encryption. Further, keys k and k' used in the same double round of an arithmetic Feistel may be different. Also, as with bitwise Feistel rounds, an arithmetic round may be inverted essentially by performing the equations in reverse order:

$$L'' = m \bmod a (L < a) \quad (EQ. 24)$$

$$R'' = m \operatorname{div} a (R < b) \quad (EQ. 25)$$

$$L' = R''(L' < b) \quad (EQ. 26)$$

$$R' = (L'' - e(k', iv', L')) \bmod a (R' < a) \quad (EQ. 27)$$

$$L = R'(R < b) \quad (EQ. 28)$$

$$R = (L' - e(k, iv, L)) \bmod b (L' < b) \quad (EQ. 29)$$

Then the original m is given in accordance with:

$$\text{inverse\_arithmetic\_round}(k, k', iv, iv'm') = m = L + a*R \quad (EQ. 30)$$

Although double rounds may be used in some embodiments, single arithmetic rounds may also be used. For increased security, the values of a and b should be approximately the same size in either a single or double round using an arithmetic Feistel scheme.

It should be understood that the use of a Feistel bitwise scheme and a Feistel arithmetic scheme represents only two possible encryption schemes; other encryption schemes, that possibly utilize a block cipher such as AES or DES, may also be used. Each round of encryption may use the same key as previous rounds or a different key.

It should also be understood that, in principle, almost any rotation could be used for a permutation step shown in FIGS. 1, 2A, and 2B. The most efficient rotation from the point of view of mixing elements, however, appears to be $$2^{n-1} = \frac{M}{2} \quad (EQ. 31)$$

A rotation of size M/2 ensures that after each permutation, the number of elements that were and were not in the encryption set before, and will be encrypted together in the next series of encryption steps, is as equal as possible, which maximizes mixing. While EQ. 31 may be used to perform a permutation or shifting of objects, other formulas or a predetermined set amount of shift may be possible.

In addition, while FIGS. 2A and 2B show one or two rounds of encryption between each iteration of permutation, various numbers of rounds of encryption may be performed (e.g., 1, 3, 5, 10, etc.) between each round of permutation. During each round of permutation, the elements maybe shifted or rotated the same amount or a different amount. While FIGS. 2A and 2B illustrate some number of rounds of encryption and permutation, it should be understood that this is for simplicity only. In actual implementations, more rounds of permutations and encryption may be performed, both because several iterations of a Feistel scheme may be required in order to encrypt securely, and in order to thoroughly mix the elements and produce an overall encryption function whose outputs appear random compared to the corresponding inputs. Following the number of encryption rounds and permutation rounds desired to be completed, the encrypted objects (represented by integers) may be decoded and have the original (now scrambled) objects inserted in place of the integers.

As will be understood by those with skill in the art, the encryption schemes of FIGS. 2A and 2B may be reversed using the same keys as used to encrypt the encrypted objects to obtain the original set of objects.

In some embodiments, additional subsets of objects may be encrypted during each round of encryption by encrypting multiple subsets during each round. For bitwise Feistel rounds, this approach may be useful when $$M + \frac{M}{2} \leq N \quad (EQ. 32)$$

Figure 3:
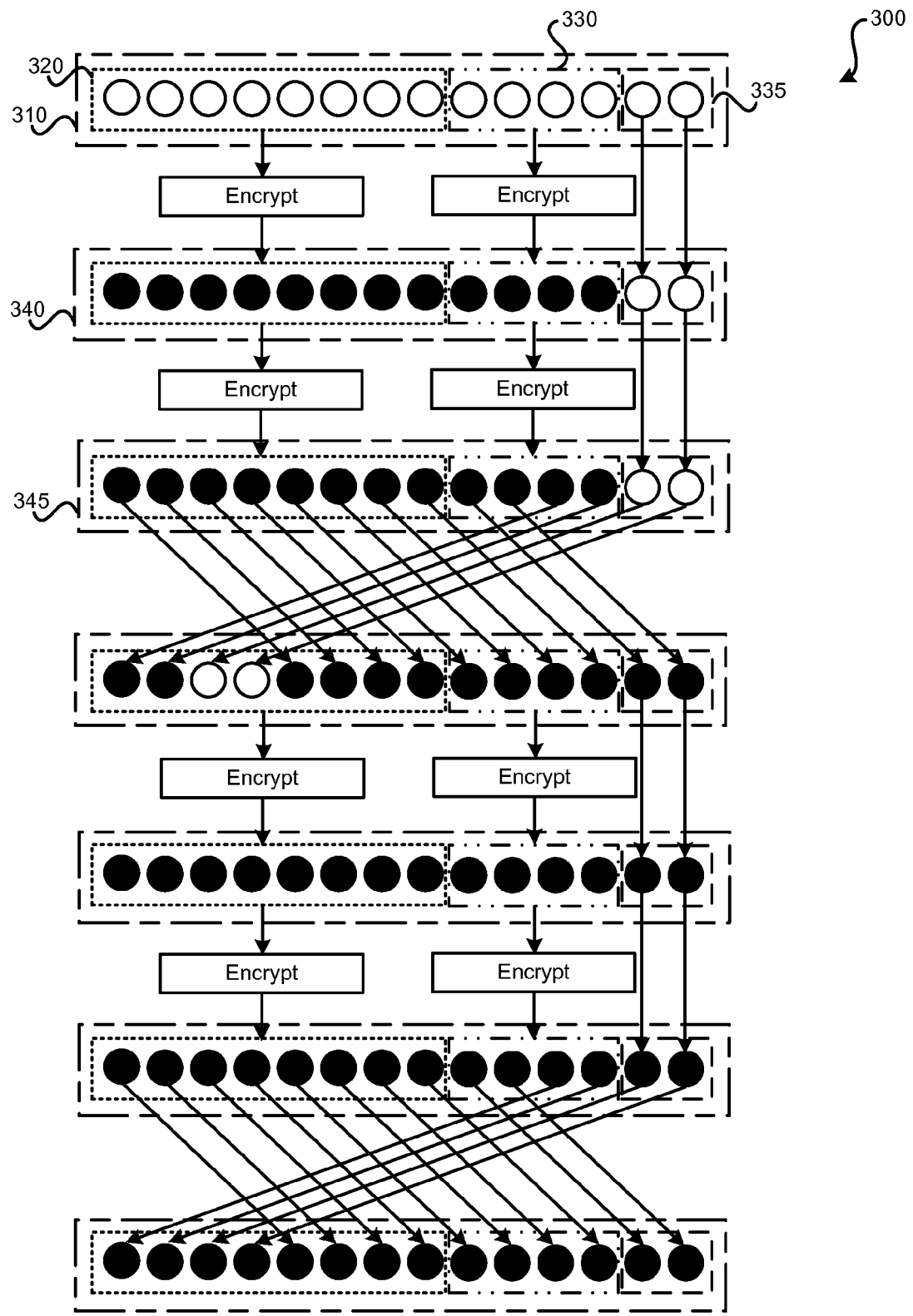
FIG. 3 illustrates a simplified embodiment of an FPE arrangement that encrypts multiple subsets of objects per round of encryption in accordance with one embodiment of the invention.

FIG. 3 illustrates a simplified embodiment of a format-preserving encryption arrangement 300 that uses multiple subsets to encrypt more objects per round of encryption. FIG. 3 illustrates a set of objects 310 with fourteen objects. Subset 320 may be encrypted using a key, subset 330 may be encrypted using the same or a different key, and subset 335 may not be encrypted in this round. As can be seen, using multiple subsets to encrypt results in fewer objects not being encrypted at each round. The subsets chosen for encryption art each round are generally disjoint subsets of set of objects 310.

As with FIGS. 2A and 2B, some number of rounds of encryption are performed before the first permutation or rotation. In FIG. 3, partially-encrypted sets of objects 340 and 345 are created through two rounds of encryption. Following the second round of encryption, a permutation is performed. As with an encryption scheme encrypting only one subset per round, EQ. 31 may be used to determine how much rotation should occur per permutation. Of course, alternatively some other equation or predetermined amount of shift may be used.

Following the first permutation, two additional rounds of encryption are performed in the embodiment of FIG. 3. Further, it should be understood that although, by the third round of encryption in the embodiment of FIG. 3, each object has been encrypted at least once, for additional security, it may be desired that each object be encrypted multiple times. As described above, if the cipher is one that needs to be applied several times to be secure (for example, as in a Feistel scheme), then on average each element may be encrypted at least that corresponding number of times to be secure.

Incorporating the multiple subsets of encryption per round with the rotation specified in EQ. 31, we may implement an illustrative bitwise Feistel scheme in accordance with the following exemplary pseudocode:

```
bitwise_rotate_fpe(key_array, iv_array, m) {
    for (int idx = 0; idx < key_array.length; idx++) {
        key = key_array[idx];
        if (key == null) {
            m = rotate(m, M/2, N);
        } else {
            iv = if (iv_array == null) then null else iv_array[idx]
            end;
            if (m < M) {
                m = bitwise_round(n, key, iv, m);
            } else if (M + M/2 < N and m < M + M/2) {
                m = bitwise_round(n-1, key iv, m - M/2) + M/2;
            }
        }
    }
    return m;
}
```

The corresponding decryption function written in pseudocode may correspond to:

```
bitwise_rotate_fpd(key_array, iv_array, m) {
    for (int idx = key_array.length - 1; idx >= 0; idx--) {
        key = key_array[idx];
        if (key == null) {
            m = rotate(m, -M/2, N);
        } else {
            iv = if (iv_array == null) then null else iv_array[idx]
            end;
            if (m < M) {
                m = inverse_bitwise_round(n, key, iv, m);
            } else if (M + M/2 < N and m < M + M/2) {
                m = inverse_bitwise_round(n-1, key iv, m - M/2) + M/2;
            }
        }
    }
    return m;
}
```

Referring back to FIG. 2A, given set of objects 202 that contains fourteen objects (N=14), the value of a may be given in accordance with:

$$a = \text{floor}(\sqrt{N}) \quad (EQ. 33)$$

If $a(a+1) \leq 1$, then let $b=a+1$, otherwise $b=a$. Let $M=ab$.

The key space for such an arithmetic Feistel round may be expanded in accordance with:

$$K' = (K \times K) \cup \{\emptyset\} \quad (EQ. 34)$$

Here, a null key will indicate a permutation step instead of an encryption step, the permutation being a predetermined rotation. Further, arithmetic_round may be extended to all numbers that are less than N by defining:

$$\text{arithmetic\_round}(k_1, k_2), (iv_1, iv_2), m) = m \text{ if } M \leq m < N \quad (EQ. 35)$$

$$\text{arithmetic\_round}(\emptyset, (iv_1, iv_2), m) = m + N - M \text{ mod } N \text{ for all } m < N \quad (EQ. 36)$$

Whether a round is an encryption round or a permutation round may be controlled by allowing for null keys and doing the permutation when a null key appears in the sequence. In some embodiments a shift may occur by an amount equal to N−M. Any number between N−M and N−2M will bring all objects that have not been encrypted thus far into the subset to be encrypted during the next round of encryption. Therefore, any number (or any equivalent mod N to such a number) may function as a suitable shift in some embodiments.

Similar to a bitwise implementation of a Feistel encryption scheme, the number of rounds (encryption and permutation) may be varied. In addition, the precise mechanics of interleaving encryption rounds with permutation rounds may be determined by the input key schedule (e.g., by letting a null keypair indicate a rotation round) and may be varied based on such factors as the strength of encryption desired, the desired latency of the encryption application, and the number of elements in the format. In some embodiments, a permutation is performed after each single or double Feistel round, and the total number of rounds is given in accordance with:

$$r*(N/M) \quad (EQ. 37)$$

where r represents the number of rounds that would be used for an ordinary arithmetic Feistel scheme with $N=M=a*b$.

The following is a piece of exemplary pseudocode meant to represent a possible implementation of FPE using arithmetic Feistel rounds:

```
arithmetic_rotate_fpe(keypair_array, iv_array, m) {
    for (int idx = 0; idx < keypair_array.length; idx++) {
        keypair = keypair_array[idx];
        if (keypair == null) {
            m = rotate(m, N - M, N);
        } else if (m < M) {
            iv = if (iv_array == null) then null else iv_array[idx] end;
            m = arithmetic_round(keypair, iv, m);
        }
    }
    return m;
}
```

An example of a corresponding decryption function may be as follows:

```
arithmetic_rotate_fpd(keypair_array, iv_array, m) {
    for (int idx = keypair_array.length - 1; idx >= 0; idx--) {
        keypair = keypair_array[idx];
        if (keypair == null) {
            m = rotate(m, M - N, N);
        } else if (m < M) {
            iv = if (iv_array == null) then null else iv_array[idx] end;
            m = inverse_arithmetic_round(keypair, iv, m);
        }
    }
    return m;
}
```

Given that format-preserving encryption may be performed on initial segments of nonnegative numbers, in principle it may be performed on any finite set of entities representable in a machine (e.g., computer) by encoding the entities as numbers, as previously described, applying format-preserving encryption to the numbers, and then decoding the numbers back to get the original objects, scrambled.

In some embodiments, the format-preserving encryption system can support passing a bitstring parameter through to the underlying block cipher. This parameter is written iv above. The underlying cipher can use the parameter an initialization vector or can concatenate it to the bitstring that it encrypts. Using a parameter can prevent the same object from being encrypted the same way in different contexts.

For example, a credit card number starts with an Issuer Identification Number (IIN) which identifies the card issuer. Although the possibilities are more complicated than described here, the IIN cannot be more than 6 digits. So an application of FPE might prefer to leave the IIN public by not encrypting the first 6 digits. In that case, these 6 digits should be passed as a parameter to the encryption of the remainder of the so that the remaining digits will be encrypted differently, depending on the first 6 digits. Otherwise, two numbers that differ only in the first 6 digits would have the rest of the digits encrypted to the same ciphertext. That would allow an adversary who knew one number to infer the other.

An example of one embodiment of the FPE scheme of the present invention is presented below in the context of U.S. social security numbers (SSNs). An SSN is a string of nine decimal digits, divided into three groups separated by a dash in the form of "xxx-xx-xxxx" where each "x" represents a decimal digit. The format is the set of valid SSNs, which includes the set of 9-digit decimal numbers with the following additional validity criteria:
1. None of the three groups are all zeroes.
2. The first group may not be "666" ("number of the beast").
3. The numbers 987-65-432x are reserved for advertising and cannot be issued as valid SSNs.
4. The number 078-05-1120 is invalid as a special case, because it was used in an early advertising campaign, after which many different people claimed that that was their SSN.

For purposes of this illustration, the invalidity of the individual number in criterion (4) may be ignored for simplicity; however, validity criteria may be as simple or complex as the application requires. Changing the set of valid SSNs may change the format, thereby changing the encoding, the number N of elements of the format, and the encryption function. Therefore, to recognize a declaration that some number is now invalid may involve re-encrypting all the SSNs in the database. The invalidity of individual numbers, however, can be accommodated the same way as the invalidity of the numbers 987-65-432x are accommodated below.

If g1, g2, and g3 are the result of encoding the three groups of decimal digits in an SSN, the encoding of a social security number may be represented by the following pseudocode. The function precodeSSN incorporates the first two validity criteria and the rest of encodeSSN incorporates the third validity criterion.

```
precodeSSN(g1, g2, g3) {
    n1 = parseInt(g1);
    n2 = parseInt(g2);
    n3 = parseInt(g3);
    m1 = n1 - 1 - (if n1 >= 666 then 1 else 0);
    m2 = n2 - 1;
    m3 = n3 - 1;
    return m3 + 99*(m2 + 998*m1);
}
encodeSSN(g1, g2, g3) {
    code = precodeSSN(g1, g2, g3);
    if (code >= precodeSSN("987", "65", "4320")) {
        code = code - 10;
    }
    // To recognize the invalidity of 078-05-1120,
    // uncomment the following lines
    // if (precode >= precodeSSN("078", "05", "1120")) {
    //   code = code - 1;
    // }
    return code;
```

Social security numbers are an interesting case for bitwise rounds with rotations. For example, given the following operating parameters:

N=987921188=0x3ae27b24 n=29, a=14, b=15

M=536870912=0x20000000

M+M/2=805306836=0x30000000 N two encryption sets may be used, namely,

{m: 0≤m≤M−1} ("Zone 1")

and

{m: M≤m≤M+M/2−1} ("Zone 2")

It may therefore take two rotations to get every element to pass through the large encryption set. To see how this happens, a representative set of SSNs may be followed through three pairs of rotation rounds, using randomly generated keys and a fixed initialization vector, split up by two rotation rounds. In the following table Z1 marks numbers in Zone 1, Z2 numbers in Zone 2, and Z3 other numbers ("Zone 3", not in either encryption set).

TABLE 1

Illustrative rounds of a bitwise FPE scheme using SSNs.

| SSN | 001-01-0001 | 123-45-6789 | 345-67-8901 | 999-99-9999 |
|---|---|---|---|---|
| Encoded (decimal) | 0 | 121214666 | 341194778 (Z1) | 987921187 |
| Encoded (hex) | 0x00000000 (Z1) | 0x073996ca (Z1) | 0x1456381a (Z1) | 0x3ae27b23 (Z3) |
| After Rd 1 (hex) | 0x00007616 (Z1) | 0x0b652985 (Z1) | 0x1c0d028b (Z1) | 0x3ae27b23 (Z3) |
| Rd 2 | 0x1b0b1f3e (Z1) | 0x14c2e165 (Z1) | 0x0145a2d8 (Z1) | 0x3ae27b23 (Z3) |
| Rd 3 (rotation) | 0x2b0b1f3e (Z2) | 0x24c2e165 (Z2) | 0x1145a2d8 (Z1) | 0x0ffffffff (Z1) |
| Rd 4 | 0x27cfafba (Z2) | 0x285942f6 (Z2) | 0x116c4c30 (Z1) | 0x1fff9f36 (Z1) |
| Rd 5 | 0x2bee9df0 (Z2) | 0x20bdb0aa (Z2) | 0x061817b6 (Z1) | 0x0f9b14aa (Z1) |
| Rd 6 (rotation) | 0x010c22cc (Z1) | 0x30bdb0aa (Z3) | 0x161817b6 (Z1) | 0x1f9b14aa (Z1) |
| Rd 7 | 0x11660131 (Z1) | 0x30bdb0aa (Z3) | 0x0bdb77f4 (Z1) | 0x0a5539fe (Z1) |
| Rd 8 | 0x0098e2cf (Z1) | 0x30bdb0aa (Z3) | 0x1bfa3790 (Z1) | 0x1cff0ec3 (Z1) |
| Encrypted SSN | 011-13-0538 | 828-08-9680 | 475-17-9999 | 492-44-6160 |

For a real implementation, more or fewer rounds may be used. For example, in a case where M is much smaller than N, more encryption rounds may be used, preferably 8 or 10, with interleaved rotation rounds.

Figure 4:
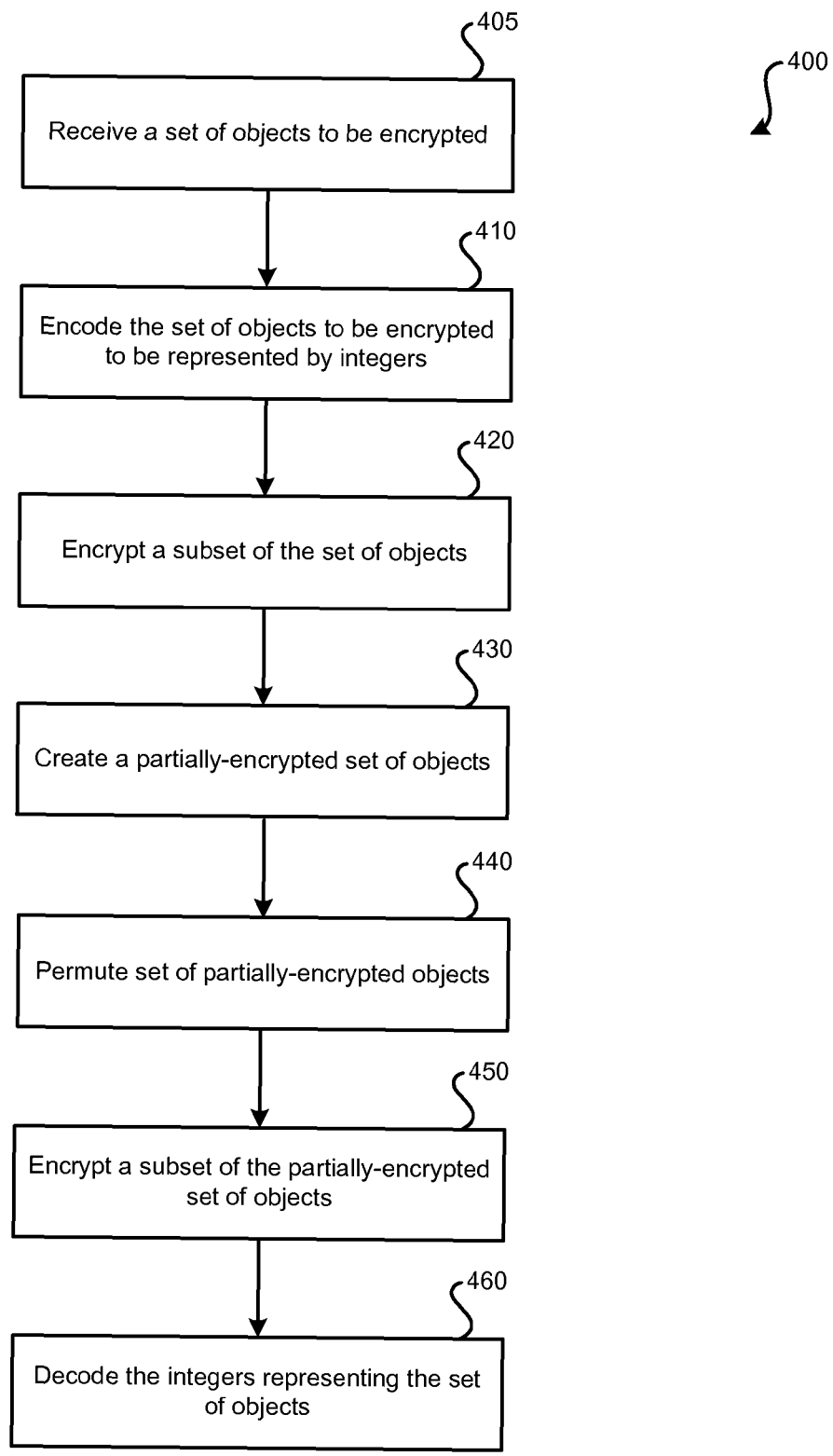
FIG. 4 illustrates a simplified embodiment of a method for encrypting a set of objects using an FPE arrangement in accordance with one embodiment of the invention.

Whether an arithmetic Feistel scheme or a bitwise Feistel scheme is used, a method such as method 400 of FIG. 4 may be used to encrypt a set of objects. FIG. 4 illustrates a simplified embodiment of a method for encrypting a set of objects using a format-preserving encryption scheme. As described above, a series of encryption and permutation rounds may be used in some embodiments. As one example, one permutation round may be interleaved between every two encryption rounds in some embodiments. The encryption performed during each encryption round may use the same cipher and the same key, the same cipher and different keys, or different ciphers. Any number of permutation rounds may be interleaved with any number of encryption rounds. As also described above, in some embodiments, permutation rounds may not be used. Instead, the subset or disjoint subsets selected for encryption during one round may be different than (but overlap with) the subset or disjoint subsets selected for encryption during a subsequent round so that permutation is not needed.

Method 400 may correspond to one or more of FIGS. 1-3 or some other encryption scheme. At block 405, a set of objects may be received that are to be encrypted. These objects may be a set of numbers, letters, symbols, or any other characters that represent information that is desired to be encrypted, such as social security numbers, bank account numbers, addresses, birth dates, names, locations, coordinates, etc.

In some embodiments, each object received at block 405 may be encoded to be represented by an integer at block 410. As such, each object present in a format (F) may be represented by an integer in a set of integers $\{0, \ldots, N-1\}$. To complement such encoding, a decoding function may also be present that is capable of decoding the set of integers $\{0, \ldots, N-1\}$ to obtain the initial format (F).

At block 420, some number of the (encoded) objects may be encrypted. Depending on the encryption technique used, only a subset of the objects may be encrypted per each encryption round such that the format be preserved. For example, if a bitwise or arithmetic Feistel encryption scheme is used, a different number of objects (e.g., in a subset) of the set of objects may be encrypted during the encryption round of block 420. If more than one subset is to be encrypted during each round, as described, for example, in connection with FIGS. 1 and 3, more than one disjoint subset may be encrypted at block 420. Assuming that the number of objects in the set of objects is not the exact equivalent of the number of objects that may be encrypted using a bitwise or arithmetic Feistel arrangement, a portion of the set of objects received at block 405 will remain unencrypted following block 420. Therefore, following block 420, some of the set of objects received at block 410 will have been encrypted, while some other objects of the set of objects will not have been encrypted.

Block 420 may represent one or more rounds of encryption. If an arithmetic Feistel arrangement is used to conduct the encryption, each round of encryption may include the subset of the set of objects being encrypted two (or more) times. Whether bitwise or arithmetic rounds are used, it may be preferable for multiple rounds of encryption (with each possibly having a different key) performed in order to increase security of the objects being encrypted. Following the rounds of encryption, a partially-encrypted set of objects may be created at block 430. This partially-encrypted set of objects may contain the subset of objects encrypted at block 420, and the unencrypted objects of the received set of objects that have yet to be encrypted.

Also, it should be noted that more than one subset of objects may be encrypted at block 420. As previously described in relation to FIGS. 1-3, in a bitwise Feistel encryption arrangement, it may be possible to encrypt multiple subsets of N in each round of encryption depending on the number of objects in the received set of objects to be encrypted.

At block 440, a permutation of the partially-encrypted set of objects may be performed. This permutation may involve shifting the location of the encrypted and unencrypted objects in the partially-encrypted set of objects. The amount of shifting within the partially-encrypted set of objects may be based, at least in part, on a predetermined formula or shift amount. Such a formula may be based on the number of objects present in the received set of objects and the number of objects present in the subset of objects encrypted at block 420. In some embodiments, a predetermined amount of shift may be used. Following the permutation of block 440, at least some of the objects that have yet to be encrypted may be shifted into the subset to be encrypted during the next round of encryption, while some of the objects that have been encrypted may be shifted out of the subset to be encrypted during the next round of encryption.

At block 450, another round of encryption may be performed. During this round of encryption, at least some of the objects that were not encrypted at block 420 may be encrypted. The encryption at block 450 may use a different key than the encryption performed at block 420. Encryption at block 450 may be performed using the same encryption arrangement, such as a bitwise or arithmetic Feistel encryption arrangement. As with block 420, block 450 may involve one or multiple subsets of the partially-encrypted set of objects being encrypted. Further, more than one round of encryption may be performed at block 450. At block 460, the integers representing the objects may be substituted with the original objects, thereby resulting in a scrambled set of objects.

It should be understood that further rounds of permutation and encryption may be present in method 400; only one round of permutation and two rounds of encryption have been shown for simplicity. For example, it may be desired that five or eight rounds of encryption be performed to ensure adequate encryption. Further, at least several rounds of permutation may be necessary to ensure all of the objects of the received set of objects are encrypted several times. The encrypted objects may be accessible via a database; however, the objects, while possibly appearing unencrypted, are encrypted (scrambled). This may render some or all of the functionality of the database useless until the objects have been decrypted.

At block 460, the now encrypted objects may be decoded. The decoded objects remain encrypted; however the objects that were replaced by integers may now be replaced with the original objects. This may result in the encrypted decoded objects being "scrambled," because, while the same objects received at block 405 are present, these objects are now in a different, encrypted order.

Further, those with skill in the art will recognize that method 400 may be used to decrypt the objects by following the method in reverse. To decrypt the objects, the encrypted objects may be encoded to be represented by integers; then a number of decryption steps and permutations may be conducted in the reverse order as presented in method 400. To properly conduct the decryption, it may be necessary to have access to a key for each round of decryption that corresponds to the key used during the respective encryption round of method 400. Further, it may be necessary to have access to the order and number of encryption rounds and permutation rounds performed. Moreover, it may be necessary to have access to (or be able to calculate) the amount of shift performed for each round of permutation.

Following the decryption of the set of objects, the objects may be presented in a database such that the information presented in the database is unencrypted and the database retains all functionality as if the objects were never encrypted. The original format of the set of objects received at block 405 may be maintained in the decoded representation of the encrypted set of objects at block 460.

Although the example of method 400 makes reference to encryption using Feistel schemes (e.g., bitwise or arithmetic Feistel schemes), any suitable encryption cipher or scheme that operates on the desired subset size to be encrypted may be used in other embodiments in addition or in place of the Feistel scheme(s).

Figure 5:
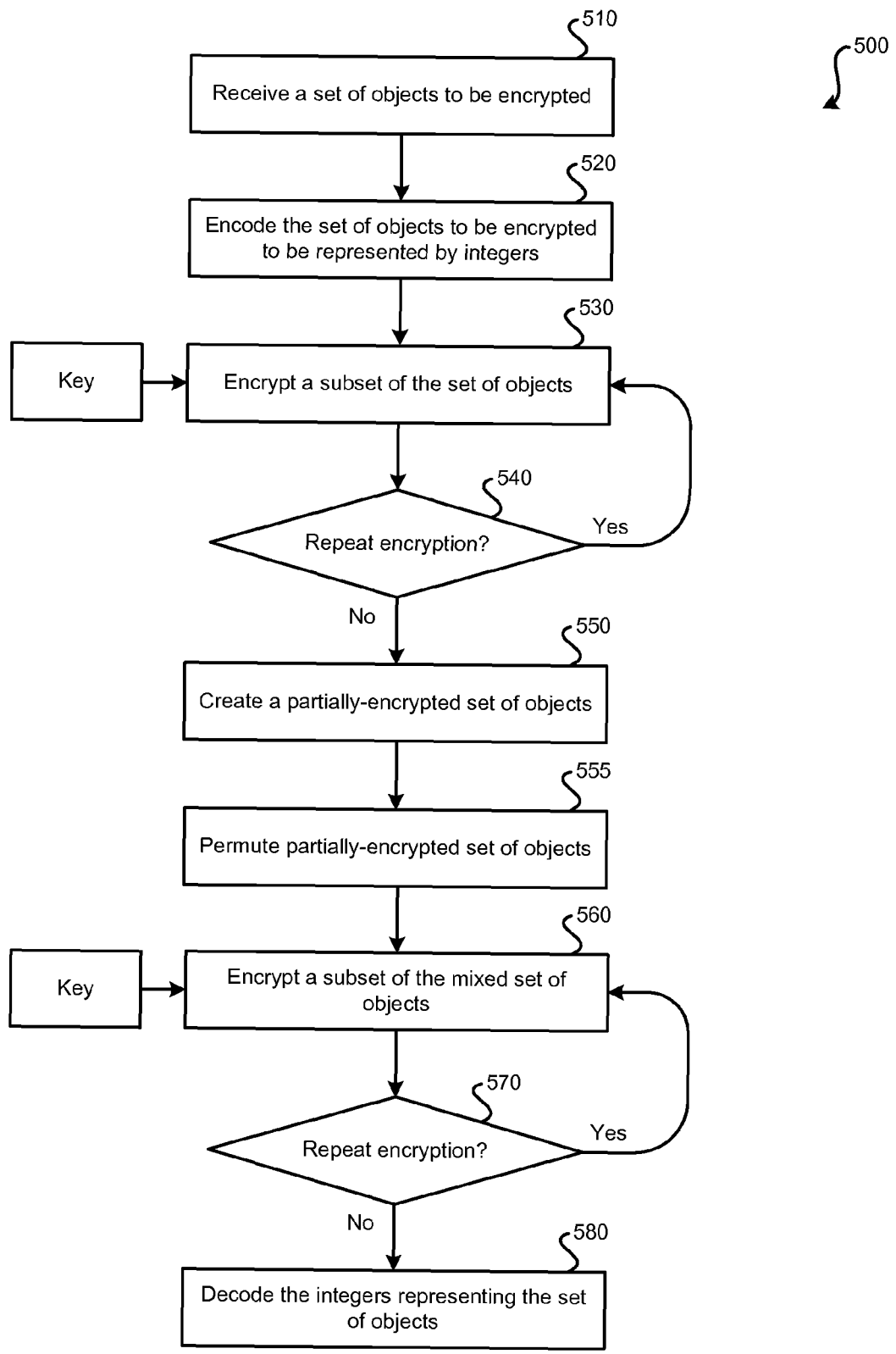
FIG. 5 illustrates another simplified embodiment of a method for encrypting a set of objects using an FPE arrangement in accordance with one embodiment of the invention.

FIG. 5 illustrates another simplified embodiment of a method 500 for encrypting a set of objects using a format-preserving encryption scheme. Method 500 may represent the same method as method 400 of FIG. 4, or may represent some other method for encrypting a set of objects using a format-preserving encryption scheme. At block 510, a set of objects to be encrypted may be received. At block 520, these objects may be encoded to be represented by a set of integers (these encoded objects will continue to be referred to as objects). A decode function or information necessary to decode the integers to obtain the objects may be stored.

At block 530, a subset of the set of objects (represented by integers) may be encrypted. Again, depending on the encryption method used, only a subset of the objects may be encrypted during each encryption round if a format is to be preserved. Depending on whether a bitwise or arithmetic Feistel encryption arrangement is used, a different number of objects of the set of objects may be encrypted during the encryption round of block 520. Assuming that the number of objects in the set of objects is not the exact equivalent of the number of objects that may be encrypted using a bitwise of arithmetic Feistel arrangement, a portion of the set of objects will remain unencrypted following block 520. Therefore, following block 520, some of the objects of the set of objects (represented by integers) will have been encrypted, while some other (integers representing the) objects of the set of objects will not have been encrypted.

A key may be used to encrypt the subset of objects at block 530. This key may be randomly generated for the encryption function. The key may then be stored such that it may be used at a future time to decrypt the encrypted subset of objects. Alternatively, instead of the key being randomly generated, a predefined key may be provided to the encryption function. The encryption function of block 530 may rely on DES, AES, or some other encryption function.

Block 520 may represent one or more rounds of encryption. If an arithmetic Feistel arrangement is used to conduct the encryption, each round of encryption may include the subset of the set of objects being encrypted twice. Whether bitwise or arithmetic, it may be preferable for multiple rounds of encryption (with each possibly having a different key) performed to order to increase security of the objects being encrypted. At block 540, if more than one round of encryption is to be performed, the method may return to block 530 for another round of encryption of the subset of objects (using the same or a different key). Once the appropriate number of encryption rounds has been completed, the method may progress to block 550.

A partially-encrypted set of objects may be created at block 550. This partially-encrypted set of objects may contain the subset of objects encrypted at block 530, and the unencrypted objects of the received set of objects (represented by the encoded integers) that have yet to be encrypted.

Also, it should be noted that more than one subset of objects may be encrypted at block 420. As previously described in relation to FIG. 3, in a bitwise Feistel encryption arrangement, it may be possible to encrypt multiple subsets of N in each round of encryption depending on the number of objects in the received set of objects to be encrypted.

At block 555, a permutation of the partially-encrypted set of objects (represented by integers) may be performed. This permutation may involve shifting the location of the encrypted and unencrypted objects in the partially-encrypted set of objects. The amount of shifting within the partially-encrypted set of objects may be based on a predetermined formula. Such a formula may be based on the number of objects present in the received set of objects and the number of objects present in the subset of objects encrypted at block 530. In some embodiments, a predetermined amount of shift may be used. Following the permutation of block 555, at least some of the objects that have yet to be encrypted may be shifted into the subset to be encrypted during the next round of encryption, while some of the objects that have been encrypted may be shifted out of the subset to be encrypted during the next round of encryption.

At block 560, one or more additional rounds of encryption may be performed. During this round of encryption, at least some of the objects that were not encrypted at block 530 may be encrypted. The encryption at block 560 may use a different key than the encryption performed at block 530. Encryption at block 560 may be performed using the same encryption arrangement, such as a bitwise or arithmetic Feistel encryption arrangement. As with block 530, block 560 may involve one or multiple subsets of the partially-encrypted set of objects being encrypted. Further, more than one round of encryption may be performed at block 560. At block 570, if more than one round of encryption is to be performed, the method may return to block 560 for another round of encryption to be performed. The number of rounds of encryption to be performed may be predetermined. The same or a different key may be used to encrypt the subset of objects during such subsequent rounds of encryption.

At block 580, the now encrypted objects may be decoded. The decoded objects may remain encrypted; however the objects that were replaced by integers may now be replaced with the original objects. This may result in the encrypted decoded objects appearing to be "scrambled," because, while the same objects are present in the encrypted set of objects as received at block 405, these objects are now in a different, encrypted order.

Following the objects being decoded, the encrypted decoded objects may be accessible via a database; however, the objects, while possibly appearing unencrypted, are encrypted (scrambled). This may render some or all of the functionality of the database useless until the objects have been decrypted.

It may not be necessary to preserve the encoding or decoding function following decoding because the original objects are scrambled. Instead, when decryption is desired, the scrambled objects may be encoded into integers, decrypted, then decoded to obtain the original unencrypted objects.

To properly conduct the decryption, it may be necessary to have access to a key for each round of decryption that corresponds to the encryption round of method 500. Further, it may be necessary to have access to the order and number of encryption rounds and permutation rounds performed. Moreover, it may be necessary to have access to (or be able to calculate) the amount of shift performed for each round of permutation.

Figure 6:
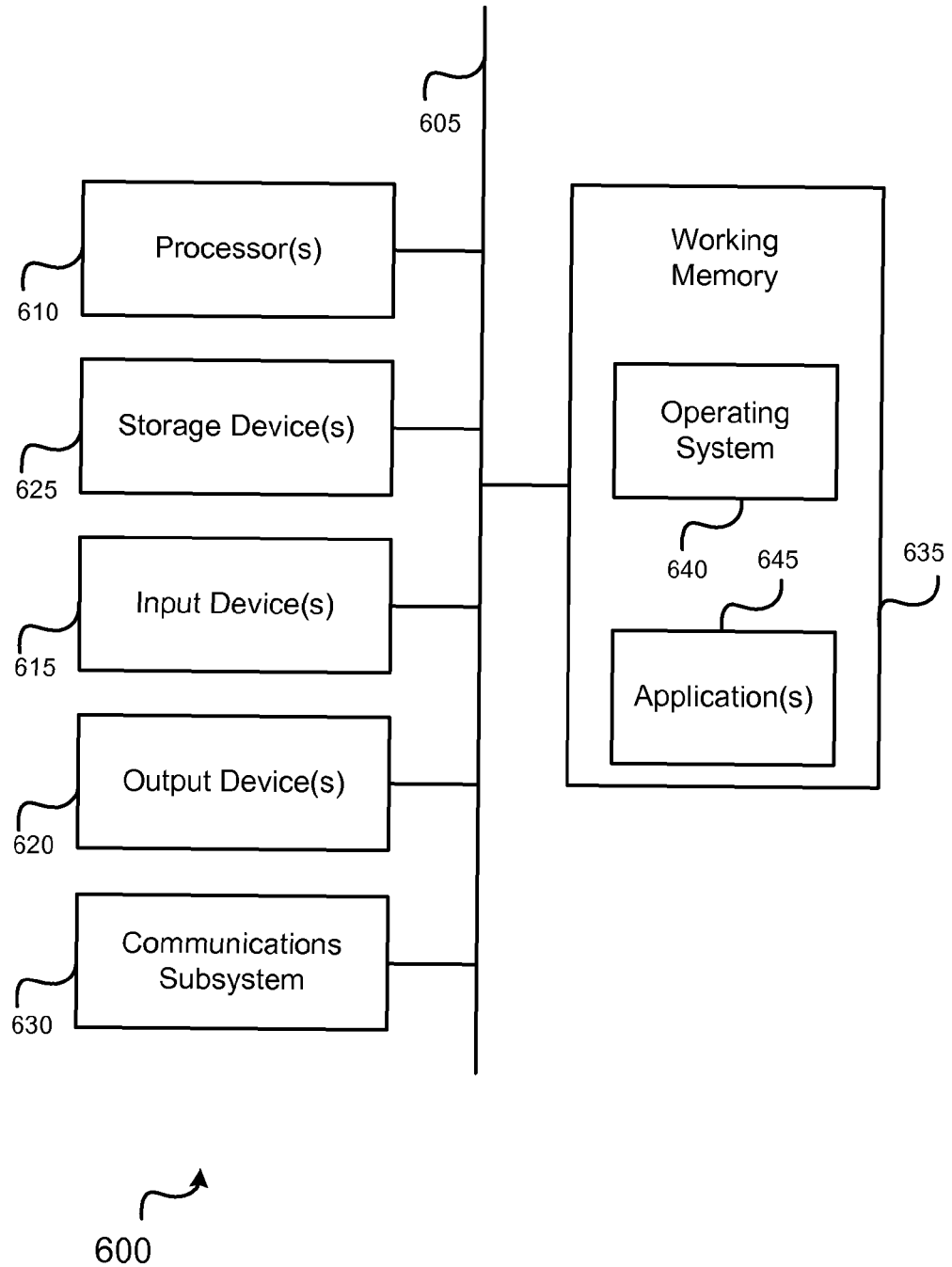
FIG. 6 illustrates an exemplary computer system that may be used to perform any of the embodiments of FPE arrangements described herein in accordance with one embodiment of the invention.

To perform the various methods or any other of the various functions described herein, a computer system may be used. A computer system as illustrated in FIG. 6 may be used. FIG. 6 provides a schematic illustration of one embodiment of a computer system 600 that can perform the methods provided by various other embodiments, as described herein, and/or can function as the host computer system, a remote kiosk/ terminal, a point-of-sale device, a mobile device, and/or a computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, computer-readable media, such as a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like. Computer-readable instructions may be recorded on the computer-readable media and executed by processor 610. The computer-readable instructions may be configured to perform part or all of any of the operations described herein (e.g., part or all of one or more of methods 400 (FIG. 4) and 500 (FIG. 5)).

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for encrypting a set of objects in a format to create an encrypted set of objects in the format, the method comprising:
    receiving the set of objects in the format, wherein the format is associated with one or more conditions that the set of objects satisfy;
    encoding each of the objects in the set of objects as an integer in a set of integers, the encoding generates an encoded set of objects;
    selecting one or more first disjoint subsets of the encoded set of objects;
    encrypting each of the selected one or more first disjoint subsets to create a partially-encrypted set of objects that comprises the encrypted one or more first disjoint subsets and one or more unencrypted subsets;
    permuting the partially-encrypted set of objects;
    selecting one or more second disjoint subsets of the permuted partially-encrypted set of objects;
    encrypting each of the selected one or more second disjoint subsets to create an encrypted set of objects that comprises the encrypted one or more second disjoint subsets; and
    decoding the encrypted set of objects to form a set of encrypted decoded objects, the encrypted decoded set of objects in the same format that the set of objects were received.

2. The method of claim 1 further comprising performing a predetermined number of additional encryption steps and a predetermined number of additional permuting steps.

3. The method of claim 2 wherein at least one of the predetermined number of additional encryption steps are interleaved between at least two of the predetermined number of additional permuting steps.

4. The method of claim 2, wherein the encrypting each of the first disjoint subsets uses a first encryption scheme and the encrypting each of the second disjoint subsets uses a second encryption scheme that is different from the first encryption scheme.

5. The method of claim 4, wherein the first encryption scheme and the second encryption scheme use a bitwise Feistel scheme or an arithmetic Feistel scheme.

6. The method of claim 2, wherein the encrypting each of the first disjoint subsets and the encrypting each of the second disjoint subsets use the same encryption scheme, but different keys.

7. The method of claim 2, wherein selecting one or more first disjoint subsets of the encoded set of objects comprises:
    selecting a subset of the format; and
    determining which objects of the set of objects are in the subset of the format.

8. The method of claim 2, wherein the permuting comprises rotating the partially-encrypted set of encoded objects.

9. The method of claim 2 further comprising saving the encrypted decoded set of objects in a database in the same format that the set of objects was received.

10. The method of claim 2, wherein the one or more conditions comprises a length constraint, a value constraint, or both.

11. The method of claim 1, wherein the encoding comprises representing each object of the set of received objects by a non-negative integer.

12. The method of claim 1, wherein the encrypting the selected one or more first disjoint subsets comprises using a first encryption scheme on one of the first disjoint subsets and a second encryption scheme on another of the first disjoint subsets, the first encryption scheme is different from the second encryption scheme.

13. The method of claim 1, wherein the encrypting the selected one or more first disjoint subsets comprises applying a format-preserving encryption (FPE) scheme to each of the one or more first disjoint subsets.

14. A system for encrypting a set of objects in a format to create an encrypted set of objects in the format, the system comprising:
a memory;
a processor; and
a storage device, wherein:
the memory is configured to receive the set of objects in the format, wherein the format is associated with one or more conditions that the set of objects satisfy;
the processor is configured to:
encode each of the objects in the set of objects as an integer in a set of integers, the encoding generates a set of encoded objects;
select one or more first disjoint subsets of the set of encoded objects;
encrypt each of the selected one or more first disjoint subsets to create a partially-encrypted set of objects that comprises the encrypted one or more first disjoint subsets and one or more unencrypted subsets;
permute the partially-encrypted set of objects;
select one or more second disjoint subsets of the permuted partially-encrypted set of objects;
encrypt each of the selected one or more second disjoint subsets to create an encrypted set of objects that comprises the encrypted one or more second disjoint subsets;
decode the encrypted set of objects to form a set of encrypted decoded objects, the encrypted decoded set of objects in the same format that the set of objects were received; and
store the encrypted decoded set of objects on the storage device in the same format that the set of objects was received.

15. The system of claim 14, wherein the processor is further configured to perform a predetermined number of additional encryption steps and a predetermined number of additional permuting steps.

16. The system of claim 15, wherein the processor being configured to encrypt each of the first disjoint subsets uses a first encryption scheme and the processor being configured to encrypt each of the second disjoint subsets uses a second encryption scheme that is different from the first encryption scheme.

17. The system of claim 16, wherein the first encryption scheme and the second encryption scheme use a bitwise Feistel scheme or an arithmetic Feistel scheme.

18. The system of claim 15, wherein the processor being configured to encrypt each of the first disjoint subsets uses a first encryption scheme and the processor being configured to encrypt each of the second disjoint subsets uses the same encryption scheme, but different keys.

19. The system of claim 15, wherein the processor being configured to select one or more first disjoint subsets of the set of encoded objects comprises the processor being configured to:
select a subset of the format; and
determine which objects of the set of objects are in the subset of the format.

20. The system of claim 15, wherein the processor is configured to permute by rotating the partially-encrypted set of objects.

21. The system of claim 15, wherein the one or more conditions comprises a length constraint, a value constraint, or both.

22. The system of claim 14, wherein the processor is configured to encode by representing each object of the set of received objects by a non-negative integer.

23. A non-transitory computer-readable medium comprising computer-readable instructions recorded thereon that, when executed by a processor, cause the processor to:
encode each object in a set of objects that have a particular format as an integer in a set of integers, the encoding generates a set of encoded objects;
select one or more first disjoint subsets of the set of encoded objects;
encrypt each of the selected one or more first disjoint subsets to create a partially-encrypted set of objects that comprises the encrypted one or more first disjoint subsets and one or more unencrypted subsets;
permute the partially-encrypted set of objects;
select one or more second disjoint subsets of the permuted partially-encrypted set of objects;
encrypt each of the selected one or more second disjoint subsets to create an encrypted set of objects that comprises the encrypted one or more first disjoint subsets;
decode the encrypted set of objects to form a set of encrypted decoded objects, the encrypted decoded set of objects having the particular format; and
store the encrypted decoded set of objects on the computer-readable medium in the particular format.

24. The computer-readable medium of claim 23, wherein the processor is configured to perform a predetermined number of additional encryption steps and a predetermined number of additional permuting steps.

25. The computer-readable medium of claim 24, wherein the processor being configured to encrypt each of the first disjoint subsets uses a first encryption scheme and the processor being configured to encrypt each of the second disjoint subsets uses a second encryption scheme that is the same as the first encryption scheme.

26. The computer-readable medium of claim 24, wherein the processor being configured to encrypt each of the first disjoint subsets uses a first encryption scheme and the processor being configured to encrypt each of the second disjoint subsets uses a second encryption scheme, the first encryption scheme and the second encryption scheme comprise either a bitwise Feistel scheme or an arithmetic Feistel scheme.

* * * * *